Dec. 6, 1966 — R. H. JENSEN — 3,290,453
COMBINATION CORD HOLDER AND OUTLET BOX ATTACHMENT
Filed Oct. 11, 1963

INVENTOR.
Robert H. Jensen.
BY Fearman Fearman & McCulloch
ATTORNEYS

United States Patent Office 3,290,453
Patented Dec. 6, 1966

3,290,453
COMBINATION CORD HOLDER AND OUTLET
BOX ATTACHMENT
Robert H. Jensen, Rte. 2, Box 128A, Oscoda, Mich.
Filed Oct. 11, 1963, Ser. No. 315,542
3 Claims. (Cl. 191—12.4)

This invention relates to cord holder attachments for electrical outlets and the like, and more particularly to a holder attachment adapted to also provide a mounting for an electrical outlet box or similar appliance.

One of the prime objects of the invention is to provide simple and easily manipulated means upon which may be wound all or excess portions of the length of a cord or cable to take up and neatly store the excess length thereof not required for its operative extensive from one given point or connection to another, said means comprising a flat frame or body on which an outlet box is also mounted, thus forming a unit which can be readily disconnected and carried from one location to another, and also provide means for retaining the cord or cable against accidental unwinding with loose portions lying exposed on the floor of the room or area.

Another object of the invention is to provide a frame attachment usable with electric fixtures and power driven tools, etc. on which any length of cord may be wound and retained, thus eliminating any excess unwound cord which would lie exposed on the face of the floor of the room, creating a hazardous and unsightly condition.

Another objection of the invention is to provide an attachment with spring tensioned hinged legs and guards which in one position secure the wound cord in position on the frame, and which in another position permits all or a certain number of cord coils being removed without retracing or unwinding the cord loop by loop.

A further object of the invention is to provide a holder attachment which can be hung on a wall or other support when in use, or for storage when not in use, which can be readily manufactured, assembled, and boxed, and which is readily adaptable for quantity production with the savings incident thereto.

A still further object is to provide a cord holder attachment and eletcrical outlet box which can be readily connected to a convenient source of power supply and to which another cord can be connected for driving a power driven tool of any desired kind.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and minor details of construction, without departing from the spirit, or sacrificing any of the advantages of the invention.

Figure 2:
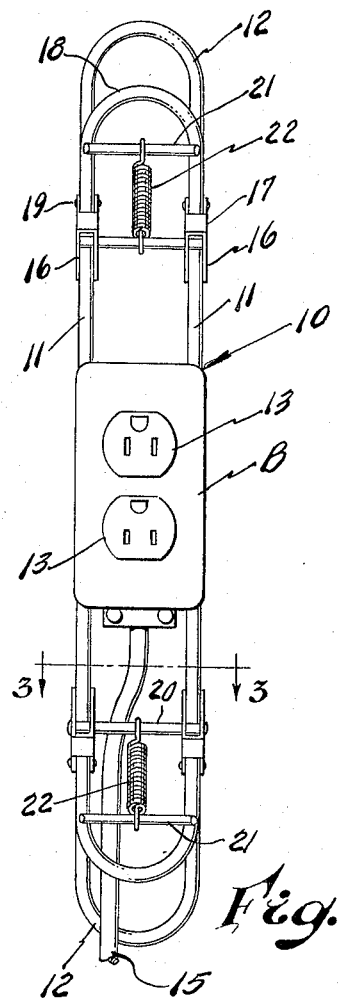
FIG. 2 is a top tan plan view thereof.

Referring now more specifically to the drawing in which I have shown the preferred embodiment of my invention.

The numeral 10 indicates the base section of the holder which comprises transversely spaced apart rod sections 11 having semi-circular ends 12 which serve as a hand hold when carrying or for hangling on a nail or other support (not shown). An electrical outlet box B is welded or otherwise secured to the rod sections 11 as shown and is provided with dual electrical outlets 13, and a conventional outlet 14 is provided in the one end wall of the outlet box B for connection of the cord 15, said box being connected to any suitable source of electrical energy (not shown) as usual.

Laterally projecting legs 16, preferably formed of sheet metal are welded to the base frame 10 in pairs, the outer ends of said legs being connected by the bent section 17, and transversely disposed, U-shaped cord guards 18 are secured to the free ends of the legs directly adjacent the section 17 by means of pins 19 as usual.

Figure 1:
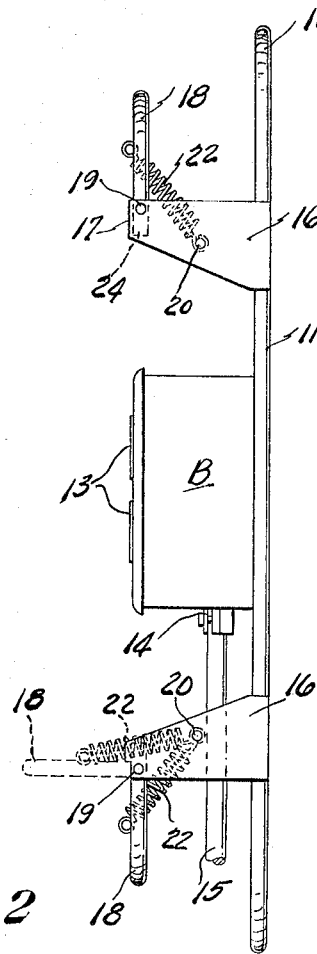
FIG. 1 is a side elevational view of my holder, the broken lines showing one of the guards swung to position to permit wound coils being slipped off without unwinding.
Figure 4:
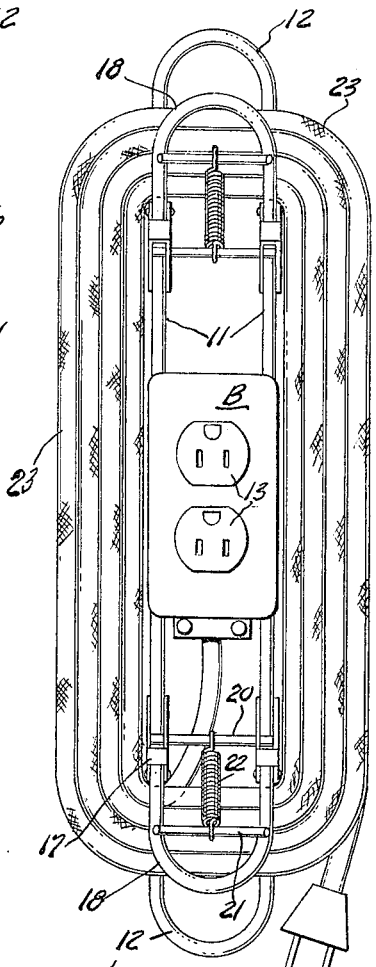
FIG. 4 is a view similar to FIG. 1 with cord wound on the holder.
Figure 3:
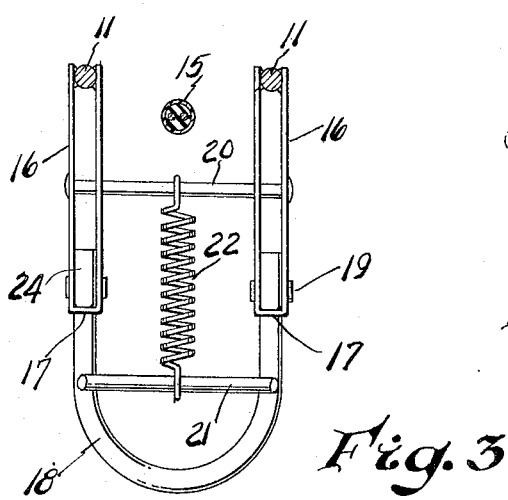
FIG. 3 is an enlarged, fragmentary, transverse, sectional view taken on the line 3—3 of FIG. 1 with the cord guard in raised position.
Figure 5:
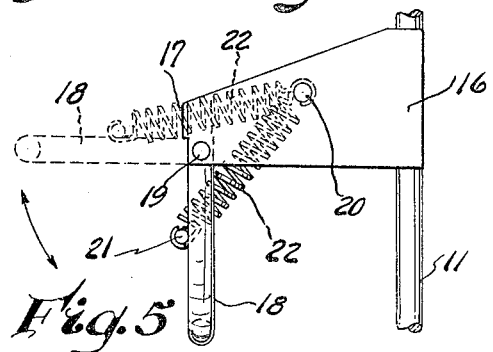
FIG. 5 is an enlarged fragmentary, side elevational view, one of the coil guards, shown in solid lines, retains the coils in coiled position, the broken line position permitting the coils to slide off of the legs.

Anchor pins 20 span the pairs of leg units 16, and similar pins 21 span the U-shaped cord guards 18, springs 22 being anchored to the anchor pins 20 and 21 respectively, and when the cord guards 18 are adjusted to extend outwardly in horizontal alignment with the legs 16, as shown in broken lines in FIG. 1 of the drawing, the coils 23 of the coiled cord 15 can be pulled off the legs and cord guards without unwinding, but when the coil guards are swung to position shown in solid lines in FIG. 5 of the drawing, the guards 18 will be parallel with the rod members 11 and the springs 22 will yieldingly hold the cord guards in set position, the leg units 16 serving as a spool upon which the cord is wound. In this position, the free ends 24 of the cord guards 18 swing into engagement with the bent sections 17 and form a stop to hold the cord guard parallel with the rods 11 and retain the coiled cord in proper position.

One or more power tools can be connected to the electrical outlets 13 of the box B and th holder can be readily mounted or hung in any desired place.

In practice, the holder attachment is hung on a suitable support (not shown) in a room or space in which work is to be done, and is connected to a suitable source of electrical energy, and power tools or other appliance (not shown) are connected thereto, only enough cord will be uncoiled to reach the point of use of the tool and no excess cord lays on the floor to provide unsightly and hazardous conditions.

Although an exemplary embodiment of the invention has been disclosed, it will be understood that other applications of the invention are possible and that the embodiment disclosed may be subjected to various changes, modifications and substitutions without departing from the spirit of the invention as defined by the following claims.

I claim:

1. A cord holder comprising a frame having pairs of spaced apart, laterally projecting legs rigidly secured thereto; an electrical outlet box mounted on said frame intermediate said pairs of legs for connection to a source of power; U-shaped cord guards pivotally connected to the free ends of each pair of legs; means connected to said cord guards and legs respectively for exerting pressure on said cord guards, resilient means connected to said legs and guards, respectively, for exerting pressure on said cord guards and stop means on said legs engagable by said cord guards to limit the swinging action of said cord guards.

2. The combination set forth in claim 1 in which the legs are formed of sheet metal and have a stop on the outer end of said legs; the U-shaped cord guards hingedly connecting the upper ends of said legs, means for tensioning the cord guards, said stop limiting the range of travel of said cord guards.

3. A cord holder comprising a frame formed with pairs of spaced apart legs rigidly secured thereto and projecting laterally therefrom; an electrical outlet box mounted on said frame intermediate said pairs of legs for connection to a source of power; U-shaped cord guards pivotally connected to the free ends of said legs; resilient means connected to said legs and cord guards respectively for exerting pressure on said cord guards; a stop provided on the legs and engagable with said cord guard for holding the cord guard in set positions of adjustment.

References Cited by the Examiner

UNITED STATES PATENTS

| | | |
|---|---|---|
| 1,365,762 | 1/1921 | Zinow. |
| 1,746,246 | 2/1930 | Elworthy _____ 242—85.1 |
| 2,156,467 | 5/1939 | Walter _____ 242—85.1 |
| 2,231,001 | 2/1941 | Engstrom _____ 191—12 X |
| 2,625,342 | 1/1953 | Moran _____ 242—85.1 X |
| 3,013,105 | 12/1961 | Craig _____ 174—135 X |
| 3,213,185 | 10/1965 | Petrick _____ 174—58 |

FOREIGN PATENTS 466,226   5/1937   Great Britain.

ARTHUR L. LA POINT, *Primary Examiner.*

S. T. KRAWCZEWICZ, *Assistant Examiner.*